United States Patent [19]

Bourgeot

[11] Patent Number: 5,031,545
[45] Date of Patent: Jul. 16, 1991

[54] RESILIENT SWIVEL JOINT FOR RAILWAY CAR SUSPENSIONS

[75] Inventor: Jacques Bourgeot, Taverny, France
[73] Assignee: Caoutchouc Manufacture et Plastiques, S.A., Versailles, France
[21] Appl. No.: 464,245
[22] Filed: Jan. 12, 1990
[30] Foreign Application Priority Data Jan. 24, 1989 [FR] France ............................. 89 00808

[51] Int. Cl.⁵ .............................................. B61F 5/00
[52] U.S. Cl. .................... 105/199.1; 105/179; 105/218.2; 267/141.1; 267/141.7; 403/228
[58] Field of Search ............. 105/84, 165, 179, 199.1, 105/199.5, 218.2; 267/140.1, 141.1, 141.2, 141.7; 403/228, 225

[56] References Cited

U.S. PATENT DOCUMENTS

| | | | |
|---|---|---|---|
| 2,048,256 | 7/1936 | Geyer | 403/228 |
| 2,180,613 | 11/1939 | Schmidt | 403/228 |
| 3,038,743 | 6/1962 | Zaloumis | 403/225 |
| 3,249,375 | 5/1966 | Herbener | 287/90 |
| 3,398,700 | 8/1968 | Baker | 105/182 |
| 3,707,920 | 1/1973 | Germer | 105/199.1 |
| 4,158,511 | 6/1979 | Herbenar | 403/228 |
| 4,214,738 | 5/1977 | Casper | 267/141.1 |
| 4,690,069 | 9/1987 | Willetts | 105/165 |

FOREIGN PATENT DOCUMENTS

| | | | |
|---|---|---|---|
| 2031374 | 6/1970 | Fed. Rep. of Germany . | |
| 2264236 | 7/1973 | Fed. Rep. of Germany . | |
| 3536283 | 10/1985 | Fed. Rep. of Germany . | |
| 2170608 | 8/1973 | France . | |
| 0148073 | 7/1985 | France . | |
| 1294675 | 3/1987 | U.S.S.R. | 105/199.1 |
| 1517901 | 3/1977 | United Kingdom . | |
| 2112056 | 7/1983 | United Kingdom . | |

OTHER PUBLICATIONS

"Spherilastik", Metalastik, Kleber, 1972.

Primary Examiner—Robert J. Oberleitner
Assistant Examiner—S. Joseph Morano
Attorney, Agent, or Firm—Thomas N. Ljungman

[57] ABSTRACT

A resilient swivel joint for railway cars and the like. The joint has a first connector and a second connector attached to one another by a resilient member. The joint includes a stop that rotates with the second connector to facilitate relative rotational movement between the first and second connectors and limit relative linear movement between the first and second connectors.

23 Claims, 3 Drawing Sheets

RESILIENT SWIVEL JOINT FOR RAILWAY CAR SUSPENSIONS

BACKGROUND OF THE INVENTION

1. Field of the Invention:

This invention relates to railway cars, which employ a connection between two rigid elements. The connection facilitates angular deflection or rotation, of one of the elements relative to the other element, in all directions while still limiting the elastic eccentricity between the two rigid elements.

2. Description of the Prior Art:

The prior art discloses various devices for spherical, or rotational, articulation, or movement, around a point. One device is, simply, a metal swivel having a spherical head and a foot, which also may be conical, fastened on a support by means of a bolt. The socket which holds the swivel can be made from two pieces of metal; one piece being hemispheric and the other piece being ring-shaped around the base of the swivel. A spring, or conical washer, may provide an elastic prestress. This device is that which has been disclosed by Lemfoerder Metal and also disclosed in German Patent No. 3,536,283.

A one-piece socket, made of plastic material, performs the same function, described above, as disclosed in U.S. Pat. No. 3,249,375, which is assigned to TRW, German Patent No. 2,031,374, which is assigned to TRW Inc. and French Patent No. 2,170,608, which is assigned to TOKAI TRW. This socket provides a certain filtering of vibrations by a polyethylene or polypropylene material and makes possible an omnidirectional prestress. Great Britain Patent No. 1,517,901, which is assigned to Ehrenreich, also describes a process for the construction of this type of swivel joint by direct stamping of the casing around the plastic socket.

In the prior art, the rubber-metal joint, in which rubber is adherized to the metal by vulcanization, has been used to improve the spherical swivel joint by eliminating any contact of metal on metal. The transmission of vibrations and the need for lubrication may, thereby, be reduced. A 1972 brochure, labeled 121/1 from Kleber, which discloses a spherical swivel joint licensed by Metalastik under the name "Spherilastik", describes the advantages of this type of design. An exterior ring, which is fabricated in three sectors in an opening, produces a radial prestress within a rubber, or elastomer material, by bringing together the spherical surfaces of the ring and provides a connection between the rubber, or elastomer, material and the ring.

The prestress provides an improved resistance to alternating fatigue and, also, provides a rigidity of the elastic connection between the two solid, or rigid elements which is limited only by deterioration of the rubber or elastomer, by metal-on-metal contact, or by friction, between the opening and a fastening shaft, or axis. This configuration achieves a maximum travel which varies with the angular position. Other techniques to apply prestress to vulcanized rubber-metal connections can be used on the swivel joints to bring the rigid elements axially closer together. European Patent No. 0,148,073 discloses a gasket for elevated-pressure tubes and hoses which employs an elastomer swivel joint which is prestressed, or compressed, by an axial geometric deformation.

With all of the above-recited devices, the relative movement of the rigid elements, which face one another and are separated by a spherical swivel made of banded elastomer, causes elastic deformation at an essentially, constant rigidity over a significant axial length of movement. Such movement may be as much as one-quarter of the thickness of the elastomer, before a deterioration, or breakdown, of the elastomer occurs. Such breakdown may occur due to detachment between the elastomer and the metal or due to bursting of the elastomer.

Situations exist where such elasticity and the corresponding displacement are disadvantageous. If a stop must be provided for either sudden or gradual motion change, and if the stop must be outside the elasticity swivel joint, then the stop takes up a considerable amount of space, otherwise the rigid surfaces which can come in contact with one another after a slight travel would not remain facing one another, irrespective of the orientation of the swivel joint. This may be possible only for spherical surfaces which are concentric with the surfaces of the elastomer swivel, which must be carefully adjusted on their supports, since the fabrication tolerances accumulate.

The prior art does not disclose an elastic swivel joint, capable of limiting elastic eccentricity and filtering vibrations which employs a vulcanized rubber/metal connection and which takes up little space.

OBJECT OF THE INVENTION

An object of the invention, therefore, is to provide a device which provides both a stop, inside a swivel, and limits elastic eccentricity, without reducing operational deflection.

SUMMARY OF THE INVENTION

The invention comprises an elastic, or resilient, swivel joint positioned between two rigid elements. The swivel joint allows angular, or spherical, deflection in all directions. The swivel joint is prestressed, or compressed, by the axial positioning of external spherical sockets which enclose layers of elastomer material. The swivel joint is reinforced by being adherized through vulcanization to the rigid elements. An important aspect of the invention is that mechanical eccentric movement is limited by the contact of a ring on an exterior member of the joint. The ring and exterior member are relatively positioned to have little play, or clearance between them. The ring is fastened to internal half-swivels on a rigid annular surface. The half-swivels are permanently elastically linked to external spherical sockets which, when moved axially toward one another, provide a prestress or compression on the elastomer.

BRIEF DESCRIPTION OF THE DRAWINGS

The present invention may be better understood when taken in conjunction with the appended drawings, in which.

DESCRIPTION OF THE PREFERRED EMBODIMENT

Figure 1:
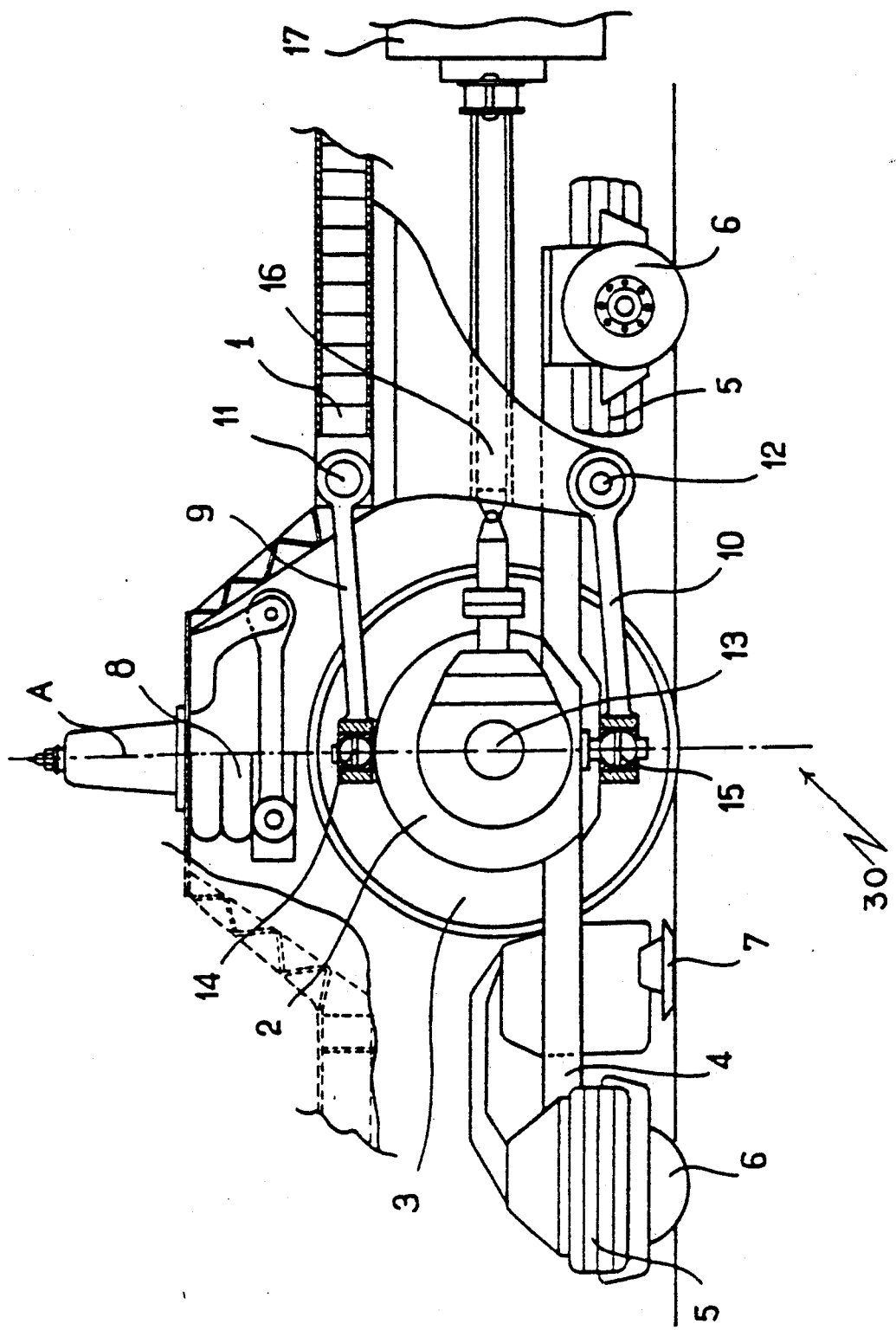
FIG. 1 is a side-elevational view of a portion of a railway car which employs the present invention.
Figure 3:
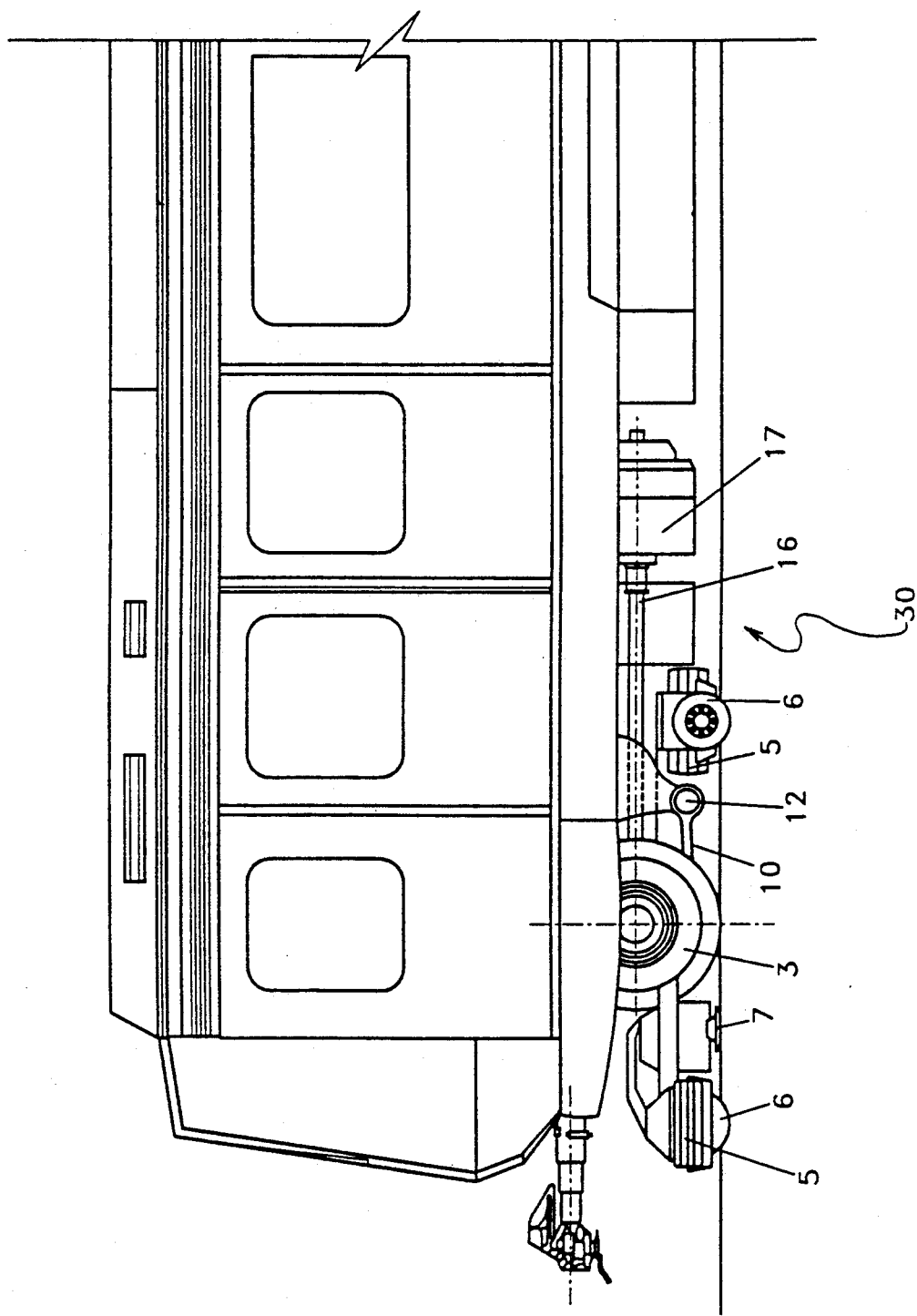
FIG. 3 is a partial, side-elevational view of a railway car which employs the present invention.

FIGS. 1 and 3 show a portion of railway car 30, which employs the present invention. In FIG. 1, the suspension of vehicle body 1 is provided by axle 2 (one shown) at each of the extremities of railway car 30. Car 30 is supported on inflatable tires 3 and guided, when rotated around vertical axis A, by a frame comprising truck 4. Truck 4 is equipped with four horizontal tires 5 which are positioned laterally bocentral switch rollers 6. Switch rollers 6 are used for switching car 30 from one track to another.

Current collecting shoes 7, as well as other equipment on truck 4, further increase the inertia of rotation of truck 4 around axle 2. The movement of vehicle body 1, relative to truck 4, is balanced by suspensions 8 (one shown) which are positioned on each side of vehicle body 1. Movement of truck 4, relative to vehicle body 1, is guided by a single parallelogram, formed in the axial plane of the vehicle, comprising upper tie-rod 9 and lower traction tie-rod 10.

Upper tie-rod 9 and lower traction tie-rod 10 oscillate during the vertical movement of vehicle body 1. Further, during transversal elastic movement, swivel joint 11, located at the extremity of upper tie-rod 9, and swivel joint 12, located at the extremity of lower traction tie-rod 10, facilitate such movement. The other ends of tie-rods 9 and 10 are fastened to the center of bridge 13, of axle 2, by upper swivel joint 14 and lower traction swivel joint 15, respectively. Upper and lower swivel joints 14 and 15 are, both, located on vertical axis A of axle 2. The motor torque as well as the braking torque exert elastic stress on swivel joints 11, 12, 14 and 15 which form the guide parallelogram. The radial elasticity of swivel joints 11, 12, 14 and 15 allows for the controlled, or steered, movement of truck 4, without providing any disadvantage for the transmission of the motor force from universal joint transmission 16, which is connected to motor 17.

An angular lifting of the frame comprising truck 4, as a result of the changes in the vertical position of horizontal tires 5 in relation to the guide rails, is unacceptable in use. Further, vertical movements of switch rollers 6, when there are dynamic deflections due to the radial elasticity of swivel joints 11, 12, 14 and 15, which exceed all allowable tolerances on account of high inertia of the masses pivoting around the horizontal axis of the axle through center of bridge 13, is also unacceptable. A solution to these problems is provided when the eccentricity of swivel joints 11, 12, 14 and 15 is geometrically limited during braking and, also, during possible dynamic overloads.

Figure 2:
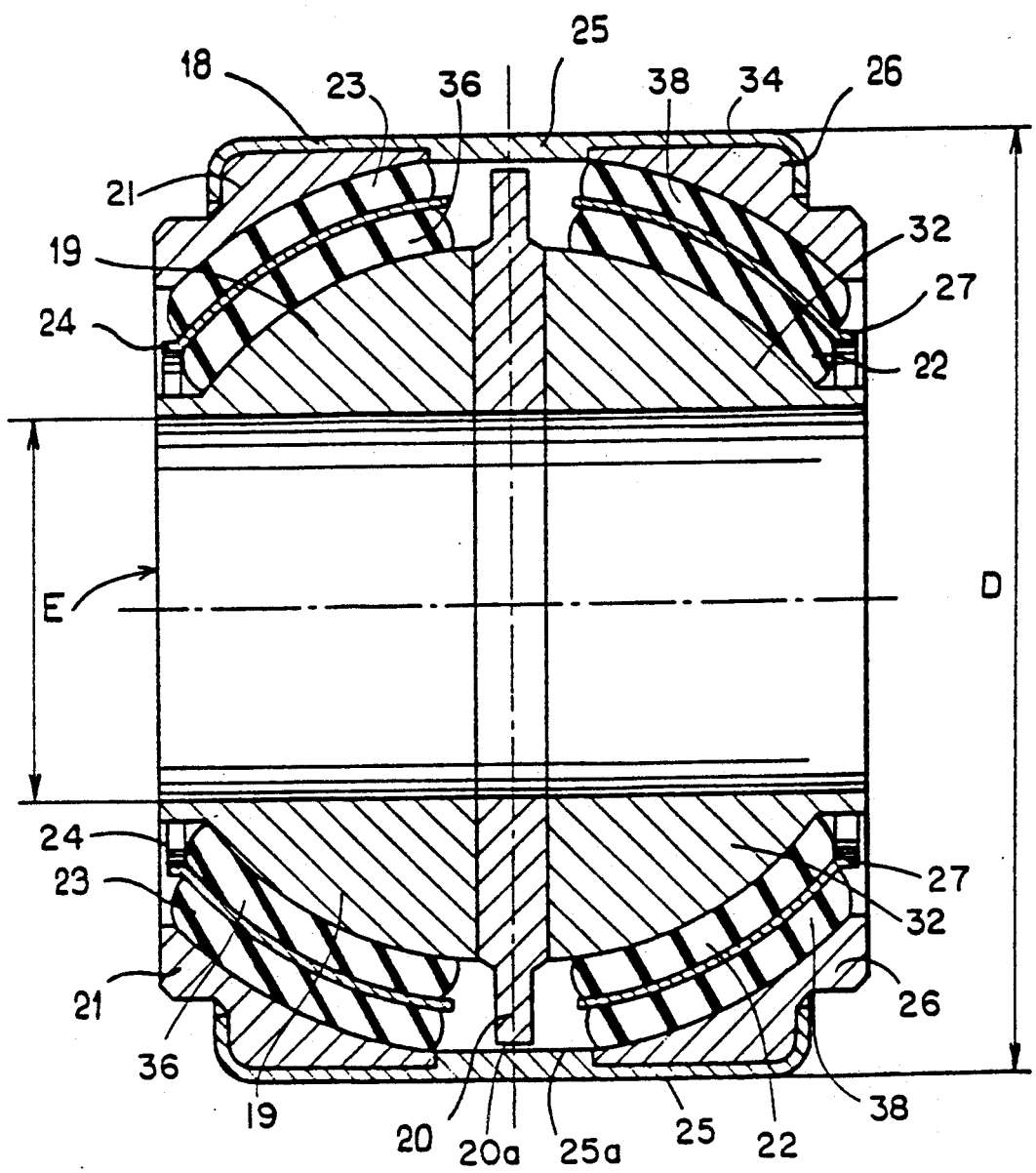
FIG. 2 is a cross-sectional view of the present invention.

Tie-rods 9 and 10 may be fastened to the body of vehicle 1, or on axle 2, by a cantilever bolt or a cap, which engages hole E as shown in FIG. 2. Swivels 11, 12, 14 and 15 are force fitted into their respective holes on tie-rods 9 and 10.

Ring 20 is interposed between half-swivels 19 and 32. Little play, or clearance, is provided between outer surface 20a, of ring 20, and inner surface portion 25a of rigid annular surface 25. Ring 20 is centered during assembly through hole E. An axial prestress, or compression, holds ring 20 between internal half-swivel 19 shown on the left side and half-swivel 32 shown on the right side. The axial force is produced by pressure applied by exterior spherical sockets 21 and 26 which are centered, or positioned, by assembly tube 18.

As shown, internal half-swivels 19 and 32 are adherized, by vulcanization during molding, with left and right, respectively, internal spherical elastomer layers 36 and 22. Layers 22 and 36, preferably, have a constant thickness. Left and right, respectively, exterior spherical sockets 21 and 26 are adherized by vulcanization during the same molding, with left and right, respectively, external spherical elastomer layers 23 and 38. Layers 23 and 38, also, have a constant thickness.

Elastomer layers 23 and 36 are adherized by vulcanization, also during molding, to internal metal armature 24, while elastomer layers 22 and 38 are adherized by vulcanization to internal metal armature 27.

Internal armatures 24 and 27 provide a reinforcement which is especially beneficial since an axial compression is applied by sockets 21 and 26, which contributes to a favorable form factor allowing internal stresses on the elastomer, on the order of 50 to 100 bars or even higher, to be exerted when more than one internal armature is used in each half of the joint. The facing spherical surfaces of sockets 21 and 26, and one or more armatures if any are provided, are offset axially in the manufacturing mold, so that when the joint is assembled and when half-swivels 19 and 32 are relatively spaced with respect to sockets 21 and 26, e.g. 4 millimeter apart, internal and external spherical elastomer layers 22, 23, 36 and 38 will have a constant thickness.

Half-swivels 19 and 32 are located on either side, respectively, of ring 20, on an assembly shaft which is common to hole E.

Exterior spherical sockets 21 and 26, under the force of the compression, are positioned against a shoulder comprising rigid annular surface 25, which is part of assembly tube 18 and is, frequently, made of metal.

A rotational locking of tube 18, above shoulder 34 of exterior spherical sockets 21 and 26, integrates all the components of the swivel joint with one another.

This assembly exhibits a rigidity of rotation around the axis common to the outside diameter D and to hole E. Also, the assembly deforms, somewhat, conically when rotated. The present invention differs from the prior art in a characteristic, which relates to the rigidity exhibited during eccentric movement. The rigidity of rotation, around the axis common to outside diameter D and to hole E, in the absence of rocking forces, is significantly reduced by the prestress, or compression, which improves the resistance to alternating fatigue. The rotation allows the rotation of axle 2 by pivoting of swivels 14 and 15 which are located on vertical axis A.

The order of magnitude of alternating fatigue stress, in one example, is a pivoting of 8 degrees, while the stress due to the lateral deflection on swivels 11 and 12 is, angularly, much lower, but much more frequent.

Conical rotation, which corresponds to rocking in the plane in FIG. 2, is a consequence of the vertical suspension deflections, whereby the axes of outside diameter D and of hole E are oriented in an essentially vertical manner.

Under this stress, the angular deflections are very limited, except when the deflections are such that pneumatic suspensions 8 act as an emergency stop, since it is required that the rigidities be as low as possible. The value of the rocking rigidity is lower than the rigidity of pivoting around the axis common to outside diameter D and hole E, because the elastomer layer is an incomplete sphere, and includes exposed lateral walls at the extremities of spherical elastomer layers 22, 23, 36 and 38.

In both types of deformations, since the rigidities of the layers are in series, it is advantageous if the layers are almost equal. However, since the cross section is slightly different, the thicknesses of the two layers can differ slightly.

The rigidity of eccentricity between two solids linked elastically, represented by the eccentricity between outside diameter D and hole E, can be very high due to the reinforcement of the elastomer layers provided by internal armatures 24 and 27. The components are selected so that the deflection, mechanically limited by the contact between outer surface 20a of ring 20 and inner surface portion 25a of rigid annular surface 25 which surrounds it, corresponds approximately to the limit stresses due to the motor torque or braking torque. This play, or clearance on the order of 0.75 to 0.8 millimeters in the illustrated example, is then eliminated during contact, and this limits lifting of the frame comprising truck 4 to an angle of a few degrees. But the play, or clearance, may not prevent the vertical suspension deflections or those due to rolling movements, which are translated by angular rotations between outside diameter D and hole E. The result is that outer surface 20a of ring 20 and inner surface portion 25a, of rigid annular surface 25, exhibit a relative angular displacement, and therefore both surfaces 20a and 25a should be spherical and concentric.

In practice, since the contact between the surface facing is occasional, a simple cylindrical machining suffices. The clearance or play, between the outer surface 20a of ring 20 and the inner surface 25a of rigid annular surface 25, even though the play is typically very small, allows for deflections. Accordingly, the bearing length, formed by outer surface 20a and the inner surface portion 25a must provide for the entire deflection of ring 20, thereby enabling the suspension to operate in a proper manner.

The suspension must, also, be able to function as an emergency stop in the depressed position on the stops. In this case, ring 20 extends obliquely by several degrees into the hole of inner surface portion 25a on rigid annular surface 25.

Ring 20 is generally disc shaped, defines an opening, defines two thickness and comprises a rigid material. Spherical elastomer layers 22, 23, 36 and 38 define an opening for receiving a portion of ring 20. Sockets 21 and 26 and half-swivels 19 and 32 each comprise a rigid material.

The operational clearance, or play can be identified for each unit swivel joint, because it is translated by a sudden change of slope during the measurement of rigidity of eccentricity between outside diameter D and hole E, a rigid shaft being then necessary to prevent a sliding of ring 20 over internal half-swivels 19 and 32 which enclose it.

The value of the elastic force described above, at which point the mechanical stop intervenes, need not be too precise, because the stoppage of movement of the parallelogram formed by swivel joints 11, 12, 14 and 15, rotating around bridge 13, is produced by four successive metal contacts. The differing limit values of each swivel joint advantageously ensures that such stoppage will be gradual. A jolt could be felt by the passengers in the car if, by chance, the four limit stops were to operate simultaneously. Therefore, equal values of rigidities would be a disadvantage. The only geometric limit values which need to be assigned are to the lifting of the frame comprising the truck 4. By means of a position adjustment during installation, either by means of bolts or cams, the eccentricities between ring 20 and hole E, and between rigid annular surface 25 and its outside diameter D, have no consequences on the geometry and can therefore, be subjected to lower-cost machining processes, such as for any other external arrangement of stops. Moreover, this stopping function is totally protected from any contamination and risk of oxidation. Corrosion of the reinforcements, even in the absence of electric currents, is prevented by the exceptional nature of the contact described above.

Therefore, in this application and in any similar application, a configuration requiring a geometric limitation of eccentricity, such a configuration being in the form of a deformable parallelogram or "three Watt bars," composed of four elastic swivel joints, can be used. Thus, the invention provides a finished and controlled part which can be put to immediate use.

The mechanical characteristics can be defined by the manufacturer of the swivel joint on the basis of a set of operating specifications, which is rarely the case in previous assemblies of several pieces since, the manufacturing tolerances accumulate.

The installation of the present invention employs conventional assembly techniques. The parts, which have an external configuration similar to swivel joints of the prior art, are completely interchangeable, and also perform the function of limiting the lifting of the chassis.

A technician skilled in the art can, of course, make various modifications to the elastic swivel joint, such as the addition of intermediate armatures, without going beyond the context of the invention.

In summary, one feature of the invention resides broadly in an elastic swivel joint located between two elements with spherical deflection each utilizing the prestress produced by axially bringing closer together exterior spherical sockets 21, 26 enclosing elastomer layers 22, 23, 36, and 38 reinforced by adherization to the rigid elements. This is characterized by the fact that a mechanical limitation of the elastic eccentricity is ensured by the contact of a ring 20, having little play or clearance, which is permanently fastened to internal half-swivels 19, 32 located against a rigid annular surface 25, which is itself permanently fastened to the exterior spherical sockets 21, 26.

Another feature of the invention resides broadly in an elastic swivel joint which is characterized by the fact that the internal 22, 36 and external 23, 38 spherical elastomer layers are adherized to the internal half-swivels 19, 32 and to the exterior spherical sockets 21, 34, which have their rigidities increased by adherization to at least one internal armature 24, 27 whereby the form factor obtained makes it possible for the geometric limitation of the eccentricity to intervene only for forces greater than or equal to the permanent stresses exerted on each swivel joint in service.

Yet another feature of the invention resides broadly in an elastic swivel joint which is characterized by the fact that the deflection, mechanically limited by the contact between the ring 20, having little play or clearance, and inner surface portion 25a of annular surface 25, corresponds approximately to the limit stresses due to the motor torque or braking torque.

A further feature of the invention resides broadly in an elastic swivel joint which is characterized by the fact that the ring 20, having little play or clearance, is inserted by simple contact against the contact planes between the internal half-swivels 19, 32 and is centered only by its inside diameter on an assembly shaft which ensures that it fits solidly with the internal half-swivels 19, 32.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A railway car comprising: wheel means;
    chassis means for being movably connected to and supported by said wheel means;
    connector means for connecting said wheel means to said chassis means;
    said connector means comprising:
       first attachment means for being attached to one of said wheel means and said chassis means;
       said first attachment means having a spherical portion;
       said first attachment means defining a first interior cavity;
       second attachment means positioned at least partially within said first interior cavity for being attached to the other one of said wheel means and said chassis means;
       resilient member means positioned at least partially within said first interior cavity for resiliently connecting said first attachment means to said second attachment means;
       said resilient member means having a spherical portion;
       said resilient member means being configured to have at least one rotational movement and at least one linear movement between said first attachment means and said second attachment means;
       stop means positioned at least partially within said first interior cavity;
       said stop means being connected to said second attachment means;
       said stop means for rotating angularly with said second attachment means and relative to said first attachment means to allow said rotational movement between said first attachment means and said second attachment means; and
       said stop means for moving linearly with said second attachment means and relative to said first attachment means for providing a limit to said linear movement between said first attachment means and said second attachment means.

2. The railway car of claim 1, wherein said resilient member means defines a second interior cavity.

3. The railway car of claim 2, further including armature means positioned at least partially within said second interior cavity.

4. The railway car of claim 3, further including socket means for being positioned adjacent said first attachment means and for being positioned adjacent said resilient member means, said socket means having a spherical portion.

5. The railway car of claim 4, further including swivel means for being positioned adjacent said second attachment means and for being positioned adjacent said resilient member means.

6. The railway car of claim 5, wherein said resilient member means is vulcanized to said swivel means.

7. The railway car of claim 6, wherein said socket means comprises first and second sockets.

8. The railway car of claim 7, wherein said first and second sockets are relatively positioned to apply a compressive force on said resilient member means.

9. The railway car of claim 8, wherein said resilient member means is vulcanized to said armature means.

10. The railway car of claim 9, further including:
    said stop means being relatively positioned with respect to said first attachment means;
    said stop means being adapted to move to contact said first attachment means to limit said linear movement between said first attachment means and said second attachment means;
    said stop means being generally disc shaped;
    said stop means defining an opening;
    said stop means defining central and peripheral portions;
    said central portion of said stop means being thicker than said peripheral portion of said stop means;
    said resilient member means, said swivel means, said socket means and said armature means, each defining a curved surface;
    said first attachment means defining both a flat surface and a curved surface;
    said stop means comprising a rigid material;
    said resilient member means defining an opening for receiving a portion of said stop means;
    said socket means comprising a rigid material;
    said swivel means comprising a rigid material;
    said armature means being positioned at least partially outside said resilient member means; and
    said first attachment means comprising striking means for receiving said contact from said stop means.

11. A joint for a railway car, said joint defining an interior cavity, said joint comprising:
    first attachment means for being attached to a first object;
    said first attachment means having a spherical portion;
    second attachment means for being attached to a second object;
    said second attachment means being positioned at least partially within said interior cavity;
    resilient member means positioned at least partially within said interior cavity;
    said resilient member means resiliently connecting said first attachment means to said second attachment means;
    said resilient member means having a spherical portion;
    said resilient member means being configured to have at least one rotational movement and at least one linear movement between said first attachment means and said second attachment means;
    stop means positioned at least partially within said interior cavity;
    said stop means being connected to said second attachment means;
    said stop means for rotating angularly with said second attachment means and relative to said first attachment means to allow said rotational movement between said first attachment means and said second attachment means; and
    said stop means for moving linearly with said second attachment means and relative to said first attachment means for providing a limit to said linear movement between said first attachment means and said second attachment means.

12. A joint comprising:
first attachment means for being attached to a first object;
said first attachment means having a spherical portion;
said first attachment means defining a first interior cavity;
second attachment means for being attached to a second object;
said second attachment means being positioned at least partially within said first interior cavity;
resilient member means positioned at least partially within said first interior cavity;
said resilient member means resiliently connecting said first attachment means to said second attachment means;
said resilient member means having a spherical portion;
said resilient member means being configured to have at least one rotational movement and at least one linear movement between said first attachment means and said second attachment means;
stop means positioned at least partially within said first interior cavity;
said stop means being connected to said second attachment means;
said stop means for rotating angularly with said second attachment means and relative to said first attachment means to allow said rotational movement between said first attachment means and said second attachment means; and
said stop means for moving linearly with said second attachment means and relative to said first attachment means for providing a limit to said linear movement between said first attachment means and said second attachment means.

13. The joint of claim 12, wherein said resilient member means defines a second interior cavity.

14. The joint of claim 13, further including armature means positioned at least partially within said second interior cavity.

15. The joint of claim 14, further including socket means for being positioned adjacent said first attachment means and for being positioned adjacent said second resilient member means, said socket means having a spherical portion.

16. The joint of claim 15, further including swivel means for being positioned adjacent said second attachment means and for being positioned adjacent said resilient member means.

17. The joint of claim 16, wherein said resilient member means is vulcanized to said swivel means.

18. The joint of claim 17, wherein said socket means comprises first and second sockets.

19. The joint of claim 18, wherein said first and second sockets are relatively positioned to apply a compressive force on said resilient member means.

20. The joint of claim 19, wherein said resilient member means is vulcanized to said armature means.

21. The joint of claim 20, further including:
said stop means being relatively positioned with respect to said first attachment means;
said stop means being adapted to move to contact said first attachment means to limit said linear movement between said first attachment means and said second attachment means;
said stop means being generally disc shaped;
said stop means defining an opening;
said stop means defining central and peripheral portions;
said central portion of said stop means being thicker than said peripheral portion of said stop means;
said resilient member means, said swivel means, said socket means and said armature means, each defining a curved surface;
said first attachment means defining both a flat surface and a curved surface;
said stop means comprising a rigid material;
said resilient member means defining an opening for receiving a portion of said stop means;
said socket means comprising a rigid material;
said swivel means comprising a rigid material;
said armature means being positioned at least partially outside said resilient member means; and
said first attachment means comprising striking means for receiving said contact from said stop means.

22. The railway car of claim 1, further including:
additional connector means for further connecting said wheel means to said chassis means;
said additional connector means being configured substantially identical to said connector means;
said additional connector means comprising:
third attachment means for being attached to one of said wheel means and said chassis means;
said third attachment means having a spherical portion;
said third attachment means defining a second interior cavity within said additional connector means;
fourth attachment means positioned at least partially within said second interior cavity for being attached to the other one of said wheel means and said chassis means;
an additional resilient member means positioned at least partially within said second interior cavity;
said additional resilient member means resiliently connecting said third attachment means to said fourth attachment means;
said additional resilient member means having a spherical portion;
said additional resilient member means being configured to have at least one rotational movement and at least one linear movement between said third attachment means and said fourth attachment means;
an additional stop means positioned at least partially within said second interior cavity;
said additional stop means being connected to said fourth attachment means;
said additional stop means for rotating angularly with said fourth attachment means and relative to said third attachment means to allow said rotational movement between said third attachment means and said fourth attachment means;
said additional stop means for moving linearly with said fourth attachment means and relative to said third attachment means to limit said linear movement between said third attachment means and said fourth attachment means; and
said stop means of said connector means providing said limit to said linear movement between said first attachment means and said second attachment means at one of: a) before, and b) after, said additional stop means of said additional connector means provides said limit to said linear movement between said third attachment means and said fourth attachment means.

23. The joint of claim 12, further including:
said stop means comprising a rigid material;
said stop means defining both a flat portion and a spherical portion.

* * * * *